United States Patent [19]

Darden

[11] Patent Number: 4,629,141
[45] Date of Patent: Dec. 16, 1986

[54] PUSH-ON DRAG KNOB

[75] Inventor: Dennis W. Darden, Tulsa, Okla.

[73] Assignee: Brunswick Corporation, Skokie, Ill.

[21] Appl. No.: 758,252

[22] Filed: Jul. 24, 1985

[51] Int. Cl.$^4$ .................. A01K 89/01; A01K 89/02
[52] U.S. Cl. .............................................. 242/84.51 A
[58] Field of Search .................. 242/84.2 A, 84.5 A,
242/84.51 A, 84.21 A, 84.2 B, 84.5 R, 84.51 R,
84.53

[56] References Cited

U.S. PATENT DOCUMENTS 3,016,232  10/1962  Clark .................................. 242/84.53
3,039,716   6/1962  Visockis ............................ 242/84.2 B
3,105,651  10/1963  Hull .................................. 242/84.2 A Primary Examiner—Billy S. Taylor
Attorney, Agent, or Firm—Wood, Dalton, Phillips, Mason & Rowe

[57] ABSTRACT

According to the invention, structure is provided through which the drag knob can be press-fit to the appropriate reel mounting structure without requiring tools or separate fasteners. Typically, such a knob is mounted to a deck plate. A male projection having an associated shoulder is provided on one of the drag adjustment knob and deck plate and is extendable into a bore on the other of the knob and deck plate in such a fashion that the shoulder serves to captively hold the knob in operative position with respect to the deck plate.

3 Claims, 6 Drawing Figures

PUSH-ON DRAG KNOB

BACKGROUND OF THE INVENTION

1. Field of the Invention

This invention relates to fishing reels with variable drag and, more particularly, to structure for mounting a drag-actuating knob.

2. Background Art

It is known to provide a rotatable knob for adjusting the drag setting on various style fishing reels. Exemplary structure is shown in U.S. Pat. No. 3,259,333, to Hull. In Hull, the drag knob has an integral cam which coacts with a spring pawl to vary the drag setting upon rotation of the knob. A separate bolt is required in Hull to assemble the knob with a rearwardly-facing frame plate for rotation relative thereto.

The Hull construction has several drawbacks. The requirement of a bolt and nut necessitates the inventory of extra items. The cost of the reel is thereby increased and the problem of handling the parts must be contended with. Further, the assembly of the reel is complicated. One must hold the drag knob in place, assemble the nut and bolt, and at the same time maintain the spring pawl in operative position.

An alternative construction utilizes a wave spring with a rivet so that the drag knob has some floating ability. This latter construction is equally complicated from the standpoint of assembly.

The present invention is specifically directed to overcoming the above enumerated problems in a novel and simple manner.

SUMMARY OF THE INVENTION

According to the invention, structure is provided through which the drag knob can be press-fit to the appropriate reel mounting structure without requiring tools or separate fasteners. Typically, such a knob is mounted to a deck plate. A male projection having an associated shoulder is provided on one of the drag adjustment knob or deck plate and is extendable into a bore on the other of the knob or deck plate in such a fashion that the shoulder serves to captively hold the knob in operative position with respect to the deck plate.

Assembly of the drag knob involves simply a press-fit step. The need for rivets, bolts and other type fasteners is obviated.

BEST MODE FOR CARRYING OUT THE INVENTION

Figure 1:
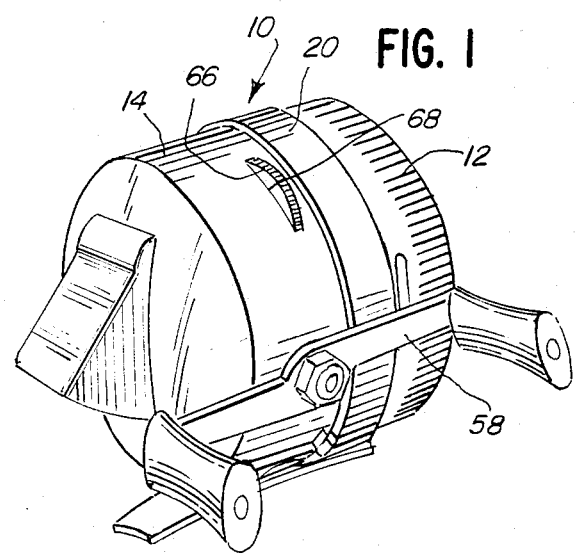
FIG. 1 is a perspective view of a spin cast style fishing reel suitable for incorporation of the present invention.
Figure 3:
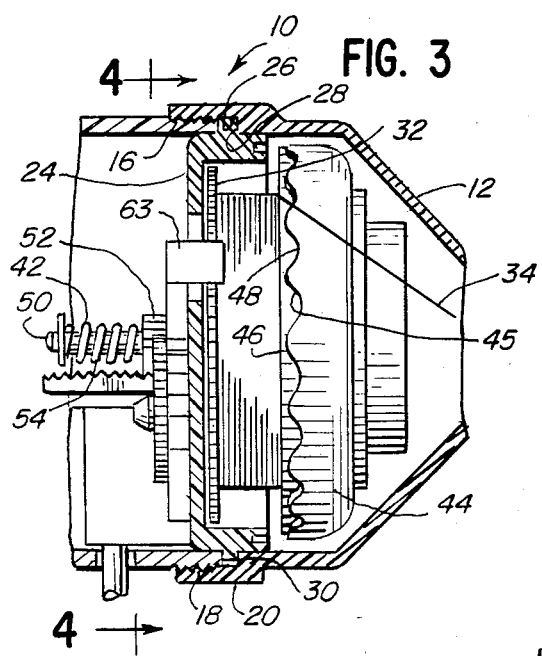
FIG. 3 is a fragmentary sectional from above of the forward portion of the reel in FIGS. 1 and 2.

Referring initially to FIGS. 1 and 3, there is shown a spin cast style fishing reel having a closed-faced housing 10, comprising a cup-shaped front cover 12 and a rear, cup-shaped casing 14. The front cover 12 has helical threads 16 formed on the rearmost internal surface thereof, as seen in FIG. 3. The rear casing 14 has on its forwardly facing end portion an external thread 18 which mates with the threaded portion 16 of the front cover 12. To facilitate relative rotation between the front cover 12 and rear casing 14, for purposes of assembly and disassembly of the housing 10, a knurled gripping portion 20 is formed about the external surface of the front cover 12. The front cover 12 converges forwardly to a line opening (not shown) through which the line exits the housing 10.

Figure 2:
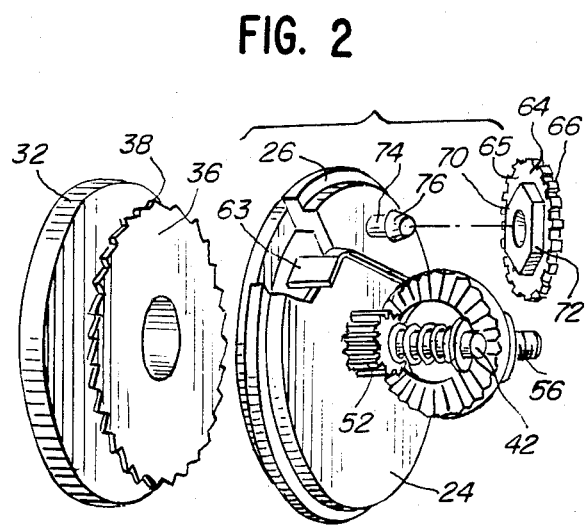
FIG. 2 is an exploded perspective of drag application structure associated with the reel of FIG. 1 with a drag actuating knob according to the invention.

Disposed within the housing 10 is the reel mechanism which controls the casting and retrieval of fishing line. The details of the mechanism can be seen most clearly in FIGS. 2 and 3. The mechanism comprises a deck plate 24 with an annular lip 26. With the front cover 12 and the rear casing 14 connected operatively, one to the other, the lip 26 is maintained captively between a shoulder 28 on the front cover 12 and the forward edge 30 of the rear casing 14 and provides support for the remainder of the reel mechanism.

Rotatably mounted on a hub on the forward side of the deck plate 24 is a spool 32 about which a supply of fishing line 34 is wound. One flange 36 of the spool 32, adjacent to the deck plate 24, has peripheral teeth 38 and defines one portion of a drag clutch at 40. Coaxially passing through the hub, the spool 32 and the deck plate 24 is a centershaft 42 having secured at one end a spinner head 44. The spinner head 44 is cup-shaped, opening rearwardly, and has a serrated free edge 45 that defines alternating peaks 46 and valleys 48. Upon rotation of the spinner head 44, the line bears against the free edge 45 and is snared between adjacent peaks and thereby follows rotation of the spinner head 44 so that line directs onto spool 32. At the opposite end of the centershaft 42 is a shaft head 50, the purpose of which will hereinafter become evident.

Disposed medially on the centershaft 42 is a pinion 52 keyed to rotate with the centershaft 42 but axially slidable relative thereto. Rotation of the pinion 52 rotates the centershaft 42 and in turn the spinner head 44 to guide the line onto the spool. To enable the fishing line to be cast, the centershaft 42 and pinion 52 are connected as by cooperative splines to permit relative axial movement therebetween. Accordingly, when the centershaft 42 is moved axially forward upon the application of a force by the operator upon a thumb button 47 that is pivotally mounted in an opening at the rear of the housing 10, the spinner head 44 uncovers the spool 32 and a latching apparatus (not shown), on the spinner head 44, cooperates with the centershaft 42 to latch the spinner head 32 in a position to permit the casting of the fishing line from the reel. A biasing spring 54 is provided on the centershaft 42 between the shaft head 50 and the pinion 52 to normally urge the spinner head 44 to its spool enveloping position for retrieval of the fishing line.

To drive the pinion 52 and thereby the centershaft 42 and spinner head 44 for retrieval of fishing line, a crank shaft 56 is rotatably disposed in a sleevebearing (not shown) carried by the deck plate 24. At one end of the crank shaft 56 is disposed a handle 58, and at the other end of the crank shaft is secured a gear (not shown) which mates with and drives the pinion 52 for rotation of the centershaft 42 which releases the latching apparatus, permitting the spinner head 44 and crank shaft 56 to be retracted.

To exert a drag upon the drag clutch 40, a clutch spring 60 (FIGS. 2-4) is mounted to a deck plate post 62. One end of the clutch spring 60, remote from the post 62, defines a follower 63. The follower 63 engages the spool teeth 38 to form the drag clutch 40, thereby resisting the rotation of the spool 32 and the concomitant paying out of a fishing line, for example, in response to the pulling of the fishing line by a fish. Should sufficient pulling force be applied to the fishing line to overcome a drag exerted by the clutch spring 40, the spool 32 will rotate to pay out line, thereby preventing breakage. The rotation of the spool 32 produces the characteristic clicking sound as the clutch spring 60 follows the rotating teeth 38 on the spool 32.

To control the amount of resistance the clutch spring 60 offers to the drag clutch 40, a drag actuating knob or wheel 64 is rotatably mounted to the deck plate 24. The invention resides in the structure mounting the drag actuating knob to the deck plate. The knob 64 comprises a disc-shaped body 65 having a notched peripheral surface 66, a portion of which protrudes through an aperture 68 in the reel housing 10 to facilitate rotation of the knob 64 by the user. Integrally formed with the disc is a cam portion 70 with a cam surface 72 which, in operative position, bears against the clutch spring 60 in varying positions, depending upon the selective rotation of the knob 64. The cam surface 72 may be defined by smooth contact surface or a plurality of segments or cords which positively engages the spring 60. In the latter construction, extra force is required to move the cam surface to align the next adjacent segment. As seen in FIG. 3, the clutch spring 60 is located closely between the disc body 65 and the deck plate 24.

According to the invention, the drag actuating knob 64 is snap-fit into its operative position. One structure accomplishing the end is shown in FIGS. 2 and 4-6. The first embodiment of the invention will be described with respect to FIGS. 2, 4 and 5. In those FIGS., a projection 74 is formed integrally with the deck plate 24 and has an enlarged head 76 adjacent its free end, remote from the deck plate. The body 78 of the projection is substantially uniform and cylindrical in cross section. The head 76 has a tapered, peripheral ramp surface 80 that diverges from its free end towards the deck plate and defines a shoulder 82 facing the deck plate 24.

The knob 64 has an axial bore 84 extending entirely therethrough. Shoulder carrying fins 86 are formed integrally with the cam portion 70 of the knob, each coverage at an angle X from the rear portion 88 of the knob towards the central axis of the knob and are deflectable radially within the bore 84. The fins 86 each carry a shoulder 90 facing the shoulder 82 associated with the projection 74. In the illustrated embodiment of FIG. 5, two fins 86 are shown, although a plurality of fins could be used.

Figure 4:
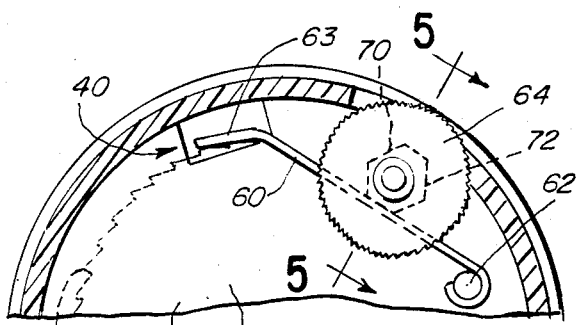
FIG. 4 is an enlarged, fragmentary sectional view of the drag application structure along line 4—4 of FIG. 3.
Figure 5:
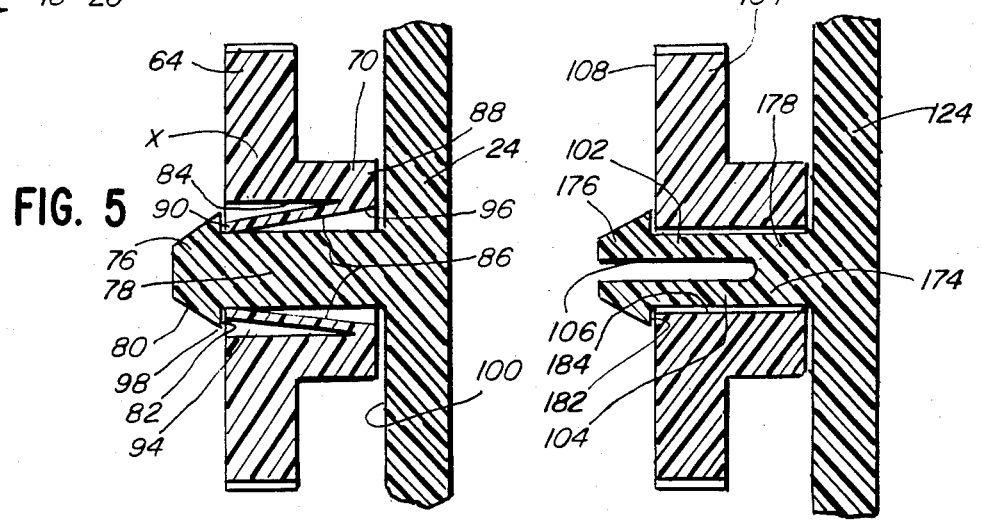
FIG. 5 is an enlarged, sectional view of the mounting structure for the drag actuating knob along line 5—5 of FIG. 4.

To assemble the knob 64, the projection is extended axially through the bore. The diameter of the leading edge 96 of the bore 84 is sufficient to accommodate the head 76. As the fins 86 encounter the head 76, they deflect radially outwardly to allow passage of the head through the bore until the fully-seated position of FIG. 5 is realized. Upon the fins traversing the trailing edge 98 of the head 76, the fins undeflect and spring back against the body 78 of the projection. In this position, the shoulders 90 on the fins face and seat behind the annular shoulder 82 defined by the head 76. Separation of the knob from the deck plate by reverse shifting the knob is prohibited. The knob 64 has an axial dimension slightly less than the distance between annular shoulder 82 on the head 76 and the forwardly facing surface 100 of the deck plate to allow free rotation of the knob. The drag spring 60 seats between the deck plate 24 and the body 65 of the knob and, as shown in FIG. 4, due to the location of the post 62 and ratchet teeth 38 on the spool, the spring 60 is resiliently urged against the cam 70. Depending on which portion of the cam 70 is in contact with the spring determines the drag on the spool.

Figure 6:
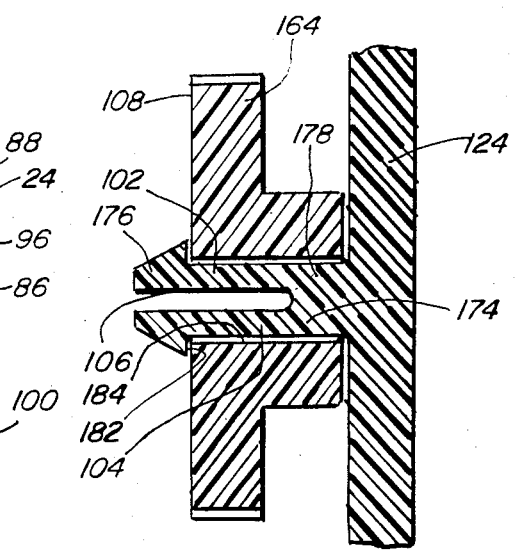
FIG. 6 is a view similar to that in FIG. 5 with an alternative mounting structure for the drag actuating knob according to the present invention.

An alternative mounting, according to the invention, is disclosed in FIG. 6. The knob 164 has substantially the same configuration as the knob 64 with the exception that the axial bore 184 is substantially uniform and only slightly greater than the diameter of the body 178 of the projection 174 integrally formed and directed forwardly of the deck plate 124. The projection 174 has an enlarged head 176 with substantially the same configuration as the prior embodiment. The body 178 of the projection 174 is bifurcated to define legs 102,104 with a slot 106 therebetween. The slot extends axially from the free end of the projection terminating short of the deck plate and has a sufficient thickness that the legs 102,104 can be deformed towards each other sufficiently that the head 176 can be extended through the bore 184. A shoulder 182 on the head 176 seats against the forwardly facing surface 108 of the knob 164 to prevent separation of the knob and deck plate.

In each embodiment, the knobs 64,164 are rotatable about the projections to choose a desired drag setting. In each instance, assembly involves merely aligning the knob bores with the projections and directing the knobs towards the deck plate until the heads 76,176 are exposed forwardly of the knobs and the shoulders 82,182 seat respectively against the shoulders 90 and the surface 108.

The foregoing detailed description is made for purposes of demonstrating the structure and operation of the invention, with unnecessary limitations to be understood therefrom. The reel construction with which the invention is described is only illustrative as mounting of drag adjustment knobs on other reel styles in similar fashion is contemplated.

I claim:

1. In a spin cast style fishing reel of the type having a line-carrying spool, a deck plate, a crank handle, means responsive to operation of the crank handle for directing line onto the spool, variable drag applying structure and a housing with a radially facing aperture therein, the improvement comprising:

a drag actuating knob for selectively varying the amount of spool drag;

means for snap-fitting the drag actuating knob to the deck plate in operative position thereon for rotation relative thereto;

said means for snap-fitting the knob comprises a projection integrally formed on the deck plate with a continuous shoulder formed on the outer portion thereof and facing the deck plate, a bore in the knob, at least two resilient deformable fins in said bore, and each fin having a shoulder seating surface facing away from the deck plate when in the assembled position in the reel, said projection extendable into the bore so that the fins are deformed upon contact with the shoulder on the projection and, upon the knob realizing a fully seated position, said deformable fins realizing an undeformed position with said continuous shoulder on the projection facing said shoulder seating surface to prevent separation of the knob from the projection, whereby the knob can be assembled directly into its operative position by a simple press-fitting step without requiring the use of tools or separate fasteners.

2. The spin cast style fishing reel according to claim 1 wherein said drag applying structure has a clutch spring and said knob has an integrally formed cam surface, said cam surface bearing against the clutch spring so that the clutch spring bears on the line-carrying spool with a force dependent upon the rotational position of the knob.

3. In a spin cast style fishing reel according to claim 1 wherein said knob in its assembled operative position having at least a portion protruding through the aperture in the housing so that the knob can be manipulated by the reel operator to effect rotation of the knob and select a desired drag setting.

* * * * *